(12) United States Patent
Nagatomi et al.

(10) Patent No.: US 7,420,894 B2
(45) Date of Patent: Sep. 2, 2008

(54) OPTICAL PICKUP DEVICE

(75) Inventors: Kenji Nagatomi, Gifu (JP); Seiji Kajiyama, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 582 days.

(21) Appl. No.: 11/201,293

(22) Filed: Aug. 11, 2005

(65) Prior Publication Data
US 2006/0077860 A1 Apr. 13, 2006

(30) Foreign Application Priority Data
Aug. 30, 2004 (JP) ............................. 2004-250958

(51) Int. Cl.
G11B 7/20 (2006.01)
G11B 7/135 (2006.01)
(52) U.S. Cl. .................................... 369/44.23
(58) Field of Classification Search ............... 369/44.23
See application file for complete search history.

(56) References Cited

U.S. PATENT DOCUMENTS 5,283,690 A * 2/1994 Miyake et al. .............. 359/566

FOREIGN PATENT DOCUMENTS

| JP | 06-131688 A | 5/1994 |
|---|---|---|
| JP | 2895150 B | 3/1999 |
| JP | 11-134702 A | 5/1999 |
| JP | 11134702 A * | 5/1999 |
| JP | 2003-149443 A | 5/2003 |

OTHER PUBLICATIONS

Korean Office Action, issued in corresponding Korean Patent Application No. 10-2005-0079198, dated on Mar. 27, 2007.

* cited by examiner

*Primary Examiner*—Gautam R Patel
(74) *Attorney, Agent, or Firm*—McDermott Will & Emery LLP

(57) ABSTRACT

Provided is an optical pickup device whose optical axis adjustment can be performed while an increase in cost is suppressed and whose optical axis correction can be accurately performed even when a variation in arrangement between laser elements occurs. The optical pickup device includes a semiconductor 101 that houses at least three laser elements having at least three different emission wavelengths in a single package, and first and second diffraction gratings 102 and 111 for substantially matching optical axes of lasers emitted from the laser elements with the optical axis of the reference laser beam by a diffraction effect. The first diffraction grating 102 matches an optical axis of a laser beam for CD (780 nm in wavelength) with the reference optical axis by a diffraction effect. The second diffraction grating 111 matches an optical axis of a laser beam for DVD (655 nm in wavelength) with the reference optical axis by a diffraction effect. Even when a variation occurs in a light emitting point gap between the laser elements, by performing fine adjustment of the corresponding diffraction grating in the reference optical axis direction, the optical axis of the laser beam can be adjusted.

7 Claims, 11 Drawing Sheets

*WHEN LASER BEAM EMISSION*

102: FIRST DIFFRACTION GRATING
SIMPLE OPTICAL PATH LENGTH : L1
101a: LASER ELEMENT ( λa = 780nm )
101b: LASER ELEMENT ( λb = 408nm )
101c: LASER ELEMENT ( λc = 655nm )

*WHEN LASER BEAM RECEPTION*

111: SECOND DIFFRACTION GRATING
SIMPLE OPTICAL PATH LENGTH : L2
112: PHOTO DETECTOR
INFRARED LASER BEAM
BLUE LASER BEAM
( λa = 780nm, λb = 408nm )
RED LASER BEAM
( λc = 655nm )

FIG. 6
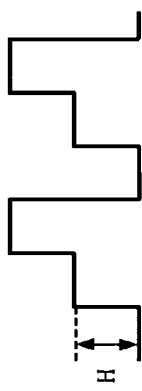
FIRST DIFFRACTION GRATING 102
THREE-STEP GRATING PATTERN
| | 408nm | 655nm | 780nm |
|---|---|---|---|
| DIFFRACTION ORDER | 0 | 0 | −1 |
| DIFFRACTION EFFICIENCY | 95.5 | 95.9 | 42.3 |
WHEN H = 4.35 μm
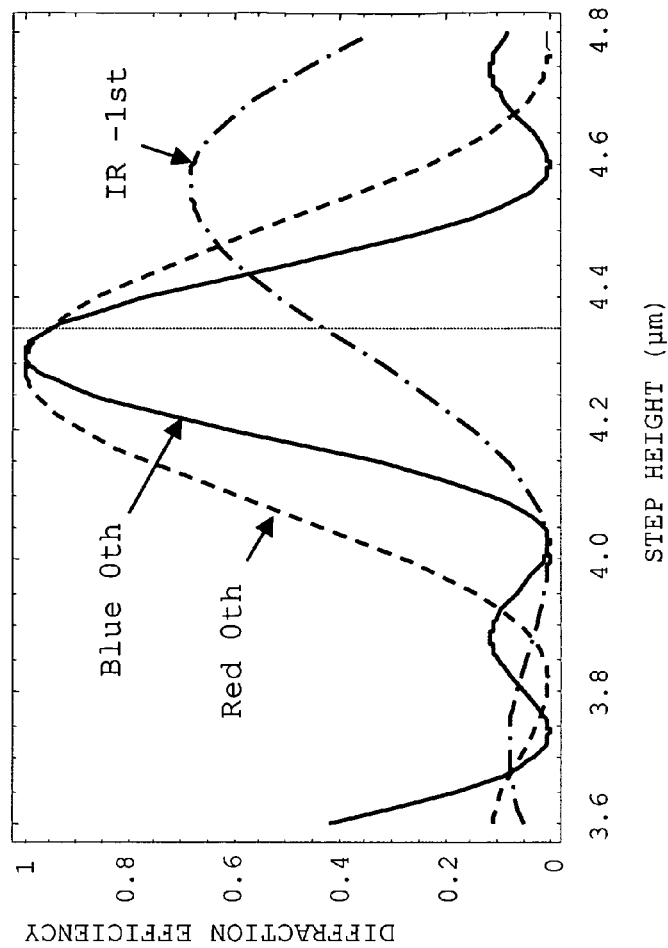
DESIGNED VALUES FOR OPTICAL AXIS ADJUSTMENT
- GRATING PITCH : Λ = 78 μm
- LIGHT EMITTING POINT GAP : d1 = 200 μm
- SIMPLE OPTICAL PATH LENGTH : L1 = 20.0 mm
REFRACTION INDEX OF DIFFRACTION GRATING
- WAVELENGTH 408 nm : n = 1.47
- WAVELENGTH 655 nm : n = 1.46
- WAVELENGTH 780 nm : n = 1.45

FIG. 7
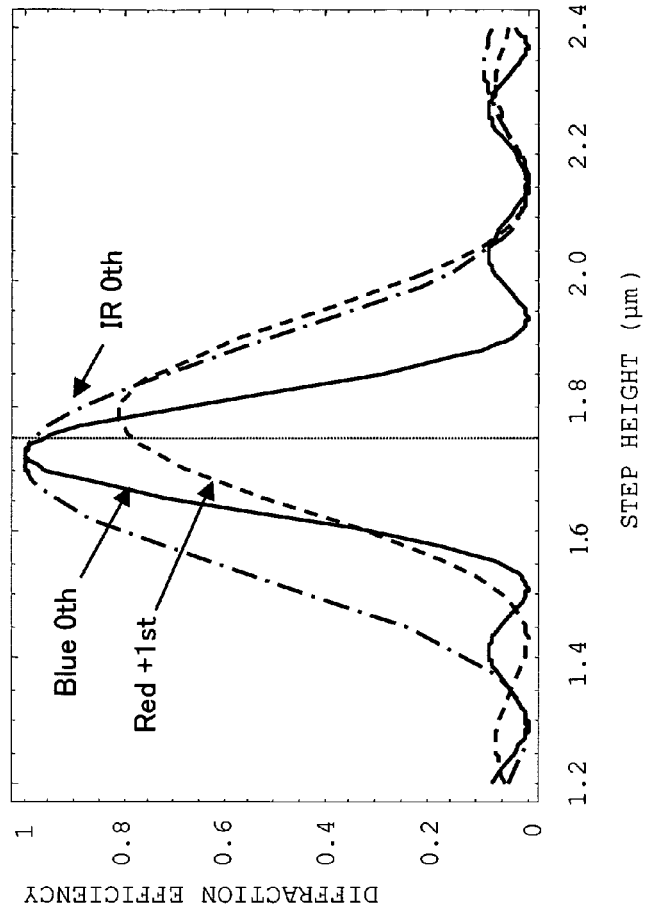
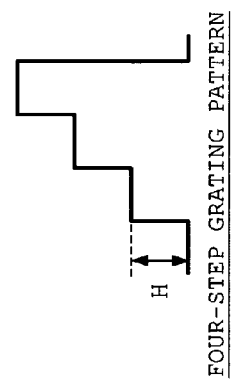
SECOND DIFFRACTION GRATING 111
FOUR-STEP GRATING PATTERN
| | 408nm | 655nm | 780nm |
|---|---|---|---|
| DIFFRACTION ORDER | 0 | +1 | 0 |
| DIFFRACTION EFFICIENCY | 96.1 | 78.2 | 98.0 |
WHEN H = 1.75 μm
DESIGNED VALUES FOR OPTICAL AXIS ADJUSTMENT
- GRATING PITCH : Λ = 131 μm
- LIGHT EMITTING POINT GAP : d2 = 150 μm
- SIMPLE OPTICAL PATH LENGTH : L2 = 30.0 mm
REFRACTION INDEX OF DIFFRACTION GRATING
- WAVELENGTH 408 nm : n = 1.47
- WAVELENGTH 655 nm : n = 1.46
- WAVELENGTH 780 nm : n = 1.45

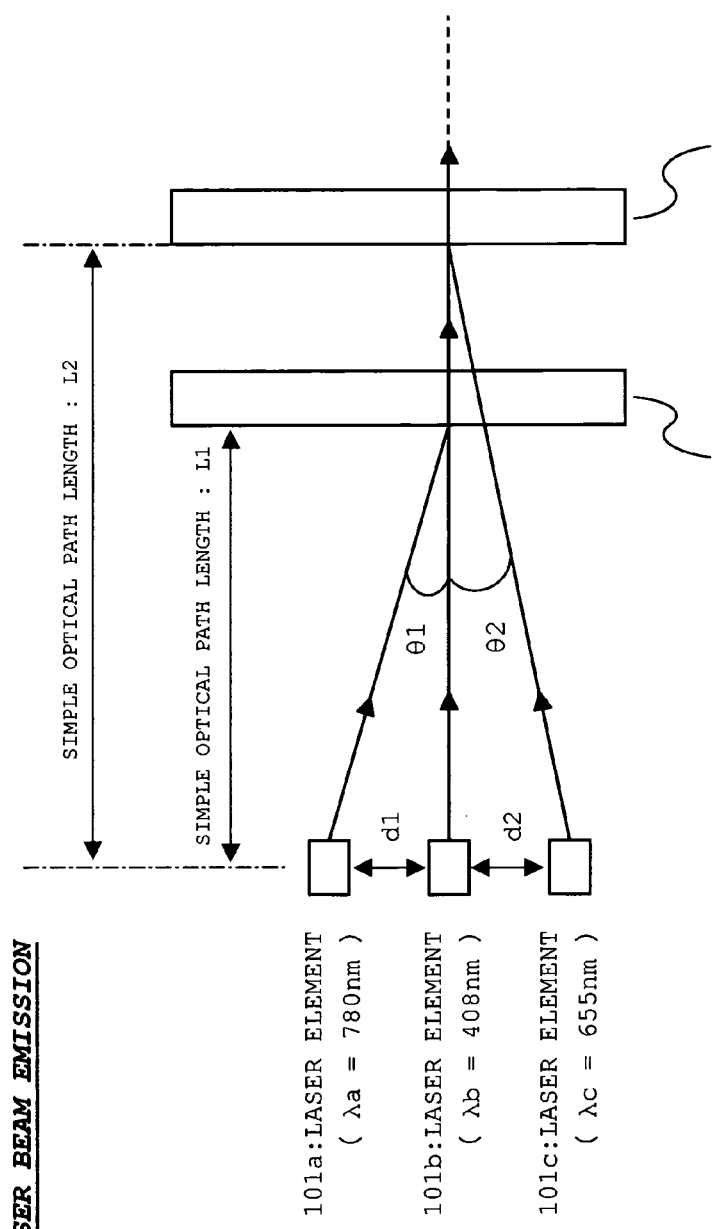

OPTICAL PICKUP DEVICE

BACKGROUND OF THE INVENTION

1. Field of the Invention

The present invention relates to an optical pickup device, and more particularly to an optical pickup device suitable for a compatible optical pickup device for emitting several kinds of laser beams having different wavelengths to a recording medium.

2. Description of the Related Art

Currently, various optical discs such as a compact disc (CD) and a digital versatile disc (DVD) have been commercialized and widely used. Further, recently, next-generation DVD standardization for recording and reproducing information using a blue-violet laser beam has been proceeding. In the next-generation DVD, information is recorded and reproduced using the blue-violet laser beam having a wavelength of about 405 nm. When the wavelength of the laser beam shortens, a higher density can be obtained.

Therefore, when the variety of optical discs increases, development of a so-called compatible optical pickup device capable of performing recording and reproduction on different kinds of optical discs is desired. In order to irradiate an optical disc with laser beams having different wavelengths, it is possible to employ an arrangement in which semiconductor lasers that emit laser beams having different wavelengths are separately disposed. However, when such arrangement is employed, spaces for separately disposing the semiconductor lasers and optical elements for guiding the laser beams to an objective lens are required. Consequently, the external dimensions become large and the number of parts increases.

Thus, an arrangement in which a plurality of laser elements having different emitting wavelengths are provided all together in a single CAN package has been studied. According to such arrangement, a space for disposing the semiconductor lasers can be reduced and an optical system can be commonly used among the laser beams.

However, when the plurality of laser elements are provided in the single CAN package as described above, a deviation in a direction perpendicular to the optical axis occurs between the optical axes of the laser beams according to arrangement gap between the respective laser elements. In this case, when the optical axis of the optical system is aligned with the optical axis of a laser beam, the optical axes of other laser beams deviate from the optical axis of the optical system. Consequently, in the case of recording and reproduction using the other laser beams, there arises a problem in that aberration of laser beams is produced on a recording medium or a photo detector to cause deterioration of optical characteristics.

Therefore, according to JP 06-131688 A, a birefringence element is disposed immediately after a semiconductor laser including several kinds of laser elements, and the optical axes of the laser beams are aligned with one another by the birefringence element to guide the laser beams to the optical system. That is, the plurality of laser elements are disposed in the same CAN package such that the polarization plane of a reference laser beam is orthogonal to the polarization plane of each of other laser beams. Then, disposed immediately after the semiconductor laser is a birefringence element that transmits the reference laser beam and refracts the other laser beams such that the optical axes thereof are aligned with the optical axis of the reference laser beam. According to this technique, with a refractive effect of the birefringence element the laser beams can be guided to the optical system located in the subsequent stage after the optical axes of the respective laser beams are aligned with one another. Thus, the laser beams having the wavelengths can be converged to a recording medium without aberration.

According to JP11-134702A, a diffraction grating is disposed immediately before a photo detector that receives reflected light beams from an optical disc, thereby guiding reflected light beams having different wavelengths to the photo detector. That is, three laser elements are disposed in the same CAN package. Laser beams having different wavelengths which are emitted from the respective laser elements are converged onto the disc by the common optical system. Then, reflected light beams from the disc are diffracted by the diffraction grating and converged onto the photo detector. According to the structure described above, the respective laser beams can be adequately converged to the photo detector. Accordingly, it is possible to obtain a detection signal with no fluctuation.

However, the conventional art described in JP 06-131688 A requires an additional birefringence element. Since the birefringence element is expensive, a problem occurs in that a cost of the optical pickup device as a whole increases. In addition, it is necessary to form in advance the laser elements such that the polarization plane of the reference laser beam is orthogonal to the polarization plane of each of the other laser beams. However, it is hard to form laser elements in which polarization planes of laser beams are made different from one another.

Refracting action of the birefringence element depends on the frequency. However, the wavelengths of the laser beams used for the compatible optical pickup device are in a close proximity to each other. Therefore, refraction angles when the laser beams having the different wavelengths are refracted by the birefringence element are not significantly different. For example, a wavelength difference between a laser beam for CD (780 nm in wavelength) and a laser beam for DVD (655 nm in wavelength) is only about 100 nm. As a result, refraction angles of those laser beams which are produced by the birefringence element become substantially equal to each other.

Therefore, when the optical axis of the laser beam for CD and the optical axis of the laser beam for DVD are to be aligned with that of a laser beam for next-generation DVD by refraction of the birefringence element, it is necessary to allow the laser beam for CD and the laser beam for DVD to enter the birefringence element with a state where the laser elements are approximated to each other to such degree that their optical axes are substantially aligned with each other. However, in manufacturing, it is nearly impossible to dispose the laser elements with the state in which they are approximated to each other to that degree. Thus, it is very hard to align the optical axis of the laser beam for CD (780 nm in wavelength) and the optical axis of the laser beam for DVD (655 nm in wavelength) with that of the laser beam for next-generation DVD by using the birefringence element.

According to the conventional art described in JP 11-134702 A, the reflected light beams having the different wavelengths are subjected to diffracting action by the only diffraction grating disposed immediately before the photo detector, thereby guiding the respective light beams onto the photo detector. In this case, when a variation from designed values occurs in arrangement or emission wavelengths of the laser elements for the different wavelengths, the reflected laser beams having the different wavelengths cannot be adequately guided onto the photo detector. To cope with that, a design of the diffraction grating needs to be suitably modified according to the variation from the designed values.

However, it is impractical to redesign, every time a variation from designed values occurs, the diffraction grating according to the variation. Therefore, in such case, practically there is no option but to use an existing diffraction grating without any modification assuming that no variation occurs. However, in this case, optical axis correction cannot be adequately performed.

SUMMARY OF THE INVENTION

An object of the present invention is to provide an optical pickup device whose optical axis adjustment can be smoothly and accurately performed while an increase in cost is suppressed and whose optical axis correction can be accurately performed by employing a diffraction grating as an optical axis correction element even when a variation in arrangement or wavelengths between laser elements occurs.

To achieve the object, an optical pickup device according to a first aspect of the present invention includes: a semiconductor laser that houses plural laser elements having different emission wavelengths in a single package; and a diffraction grating for substantially matching by an diffraction effect, optical axes of laser beams among laser beams emitted from the laser elements except a reference laser beam whose optical axis conforms to an optical axis of an optical system with the optical axis of the reference laser beam. Here, the diffraction grating is individually prepared corresponding to laser beams subjected to optical axis correction. Also, the diffraction grating is arranged at a position on the optical axis of the optical system at an optical path length L' expressed by the following expression from a laser element for emitting the reference laser beam:

$$L' = (L-Z)\left(\sqrt{1+\frac{(2X\cdot\Delta X+2Y\cdot\Delta Y+\Delta X^2+\Delta Y^2)}{(X^2+Y^2)}}-\frac{\Delta\lambda}{(\lambda+\Delta\lambda)}\right)+Z+\Delta Z \quad (A)$$

where:

when a travelling direction of the reference laser beam is set as Z axis of a three-dimensional orthogonal coordinate and the laser element for emitting the reference laser beam is arranged at its origin, X, Y, and Z denote coordinate positions on a coordinate axis of the laser element for emitting an optical axis adjustment target laser beam as designed values for the semiconductor laser;

$\Delta X$, $\Delta Y$, and $\Delta Z$ denote variations between the designed values and the coordinate positions on the coordinate axis of the laser element for emitting the optical axis adjustment target laser beam as values of the X, Y, and Z axes of the coordinate axis;

$\lambda$ denotes a wavelength of the optical axis adjustment target laser beam as designed values for the semiconductor laser;

$\Delta\lambda$ denotes a wavelength variation between the wavelength of the optical axis adjustment target laser beam and the designed values of the semiconductor laser; and $$L=\Lambda\cdot\text{ROOT}(X^2+Y^2)/(m\cdot\lambda)+Z$$

($\Lambda$ denotes a grating pitch, and m denotes a diffraction order).

In the optical pickup device according to the first aspect, the diffraction grating is arranged in a range between an upper limit value and a lower limit value of the optical path length L calculated by assigning specification values (permissive value) of $\Delta X$, $\Delta Y$, $\Delta Z$, and $\Delta\lambda$ to the expression (A).

Also, in the optical pickup device accord according to the first aspect, the diffraction grating may be arranged in a range of an optical path length L' with a margin of addition or subtraction of an optical path length La expressed by the following expression:

$$La=(1/\tan\theta 1)(fa/fb) \quad (B)$$

where:

$\theta$ denotes an incident angle of the optical axis adjustment target laser beam, at a position where the reference laser beam enters the diffraction grating, with respect to the optical axis of the reference laser beam, when the diffraction grating is arranged at the optical path length L' from the laser element for emitting the reference laser beam;

fa denotes a focal distance of a collimator lens for converting the laser beam emitted from the semiconductor laser into a parallel beam; and fb denotes a focal distance of an objective lens for converging the laser beam onto the recording medium.

Further, in the optical pickup device according to the first aspect, when an optical axis of a laser beam entering a photo detector is matched with the optical axis of the reference laser beam, the diffraction grating may be arranged at a position on the optical axis of the optical system at an optical path length Lpd expressed by the following expression from the photo detector:

$$Lpd=(f2/f1)(L-Z) \quad (C)$$

where:

f1 denotes a focal distance of the collimator lens for converting the laser beam emitted of the semiconductor laser into the parallel beam; and f2 denotes a focal distance from the condensing lens for converging the laser beam from the recording medium onto the photo detector.

Further, in the optical pickup device according to the first aspect, when a substrate element is arranged between the diffraction grating and the laser element or between the diffraction grating and the photo detector, the diffraction grating may be arranged at an optical path length obtained by adding an optical path length $\Delta Lm$ expressed in the following expression to the optical path length calculated in the expressions:

$$\Delta Lm = \sum_{i=1}^{n} ti\left(1-\frac{1}{ni}\right) \quad (D)$$

where ti and ni denote a thickness in an optical axis direction and a refractive index of the substrate element, respectively.

In the optical pickup device according to this aspect, the position of the diffraction grating in an in-plane direction is set such that a pitch direction of the diffraction grating matches a direction of an incline angle $\theta d'$ expressed in the following expression:

$$\theta d'=(Y\cdot\Delta Y-X\cdot\Delta X)/(Y\cdot(Y+\Delta Y)) \quad (E)$$

where $\theta d'$ denotes an incline angle at an X-Y plane with respect to the Y axis provided that Y>>X.

At this time, the position of the diffraction grating in the in-plane direction may be set such that the pitch direction of the diffraction grating falls in a range of the upper limit value and the lower limit value of $\theta d'$ calculated by assigning the specification values (permissive values) of $\Delta X$ and $\Delta Y$ to the expression (E).

An optical pickup device according to a second aspect of the present invention includes: a semiconductor laser that houses plural laser elements having different emission wavelengths in a single package; and a diffraction grating for substantially matching by an diffraction effect, optical axes of laser beams among laser beams emitted from the laser elements except a reference laser beam whose optical axis conforms to an optical axis of an optical system with the optical axis of the reference beam. Here, the diffraction grating is individually prepared corresponding to laser beams subjected to optical axis correction. Further, a position of the diffraction grating in an in-plane direction is set such that its pitch direction matches a direction of an incline angle of θd' expressed in the following expression:

$$\theta d'=(Y \cdot \Delta Y-X \cdot \Delta X)/(Y \cdot (Y+\Delta Y)) \quad (F)$$

where:

when a travelling direction of the reference laser beam is set as Z axis of a three-dimensional orthogonal coordinate, X and Y denote coordinate positions on a coordinate axis of the laser element for emitting an optical axis adjustment target laser beam as designed values for the semiconductor laser;

ΔX and ΔY denote variations between the designed values and the coordinate positions on the coordinate axis of the laser element for emitting the optical axis adjustment target laser beam as values of the X and Y axes of the coordinate axis; and θd' denotes an incline angle at an X-Y plane with respect to the Y axis provided that Y>>X.

In the optical pickup device according to the second aspect, the position of the diffraction grating may be set such that the pitch direction of the diffraction grating falls in a range of the upper limit value and the lower limit value of θd' calculated by assigning the specification values (permissive values) of ΔX and ΔY to the expression (F).

According to the present invention, an inexpensive diffraction grating is used for an optical element for optical axis correction. Thus, the increase in cost of the optical pickup device can be suppressed. Also, an individual diffraction grating is prepared corresponding to a laser subject to optical axis correction. Thus, even when a variation from designed values occurs in arrangement or emission wavelengths of the laser elements, by adjusting the diffraction grating location in an optical axis direction, it is possible to conform the optical axis of the laser beam to the optical axis of the reference laser beam. At this time, the diffraction grating is arranged based on the above expressions (A) to (F) and its location is appropriately adjusted in the optical axis direction. Accordingly, the diffraction grating arrangement and location adjustment can be easily and smoothly performed.

According to the present invention, the laser beam optical axis adjustment can be easily and smoothly performed while the increase in cost of the optical pickup device is suppressed.

BRIEF DESCRIPTION OF THE DRAWINGS

The above-mentioned and other objects of the present invention and the novel features thereof will be completely more clear when the following description of the embodiment is read with reference to the accompanying drawings, in which:

FIG. 6 shows a result obtained by simulation of diffraction efficiency of the first diffraction grating;

FIG. 7 shows a result obtained by simulation of diffraction efficiency of the second diffraction grating;

FIG. 11 shows a modification of the embodiment.

DETAILED DESCRIPTION OF THE PREFERRED EMBODIMENT

Hereinafter, an embodiment of the present invention will be described with reference to the accompanying drawings.

Figure 1:
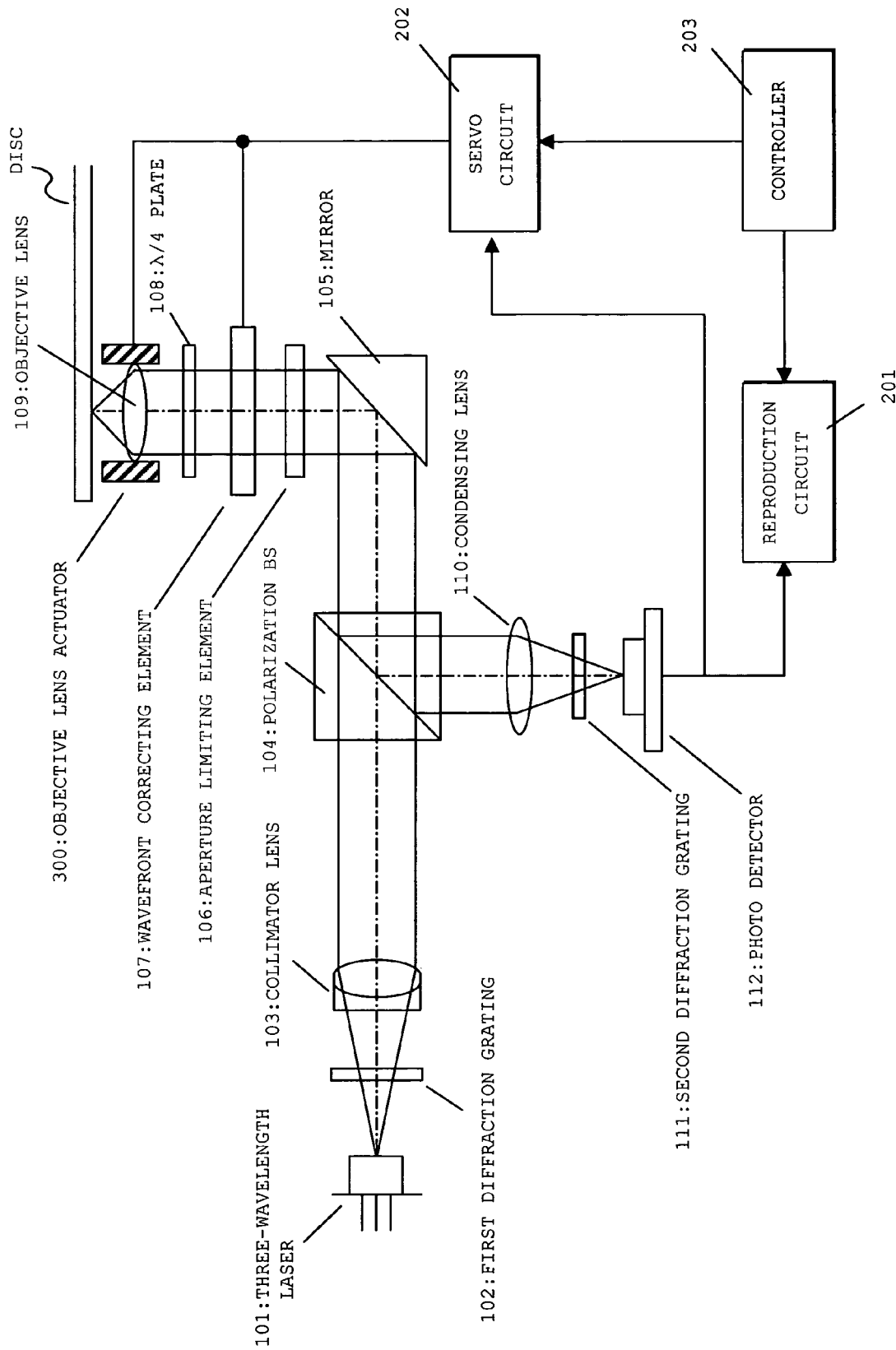
FIG. 1 shows a structure of an optical pickup device according to an embodiment of the present invention.

FIG. 1 shows a structure of an optical pickup device according to an embodiment of the present invention. The optical pickup device is used as a compatible device for CD/DVD/next-generation-DVD. In FIG. 1, a reproduction circuit 201, a servo circuit 202, and a controller 203 are components on the side of an optical disc apparatus.

As shown in FIG. 1, the optical pickup device includes a three-wavelength laser 101, a first diffraction grating 102, a collimator lens 103, a polarization BS (beam splitter) 104, a mirror 105, an aperture limiting element 106, a wavefront correcting element 107, a λ/4 plate 108, an objective lens 109, a condensing lens 110, a second diffraction grating 111, a photo detector 112, and an objective lens actuator 300.

The three-wavelength laser 101 has three laser elements that emit a laser beam for CD (780 nm in wavelength), a laser beam for DVD (655 nm in wavelength), and a laser beam for next-generation DVD (408 nm in wavelength), respectively, which are housed in the same CAN package. The respective laser elements are aligned on a straight line at predetermined gaps. Polarization planes of the laser beams emitted from the respective laser elements are parallel to one another. The arrangement of the respective laser element will be described later.

The first diffraction grating 102 aligns the optical axis of the laser beam for CD, among the laser beams emitted from the three-wavelength laser 101, with the optical axis of the laser beam for next-generation DVD by the diffracting action. That is, a pattern designed to be capable of correcting a deviation in optical axis of the laser beam for CD is formed in the first diffraction grating 102. A structure of the diffraction grating and optical axis deviation correcting action thereof will be described later.

The collimator lens 103 converts each of the incident laser beams having the different wavelengths from the first diffraction grating 102 into a parallel light beam. For example, the collimator lens 103 is formed by bonding a plurality of lenses whose Abbe numbers and curvatures (spherical surfaces) are adjusted such that an achromatic effect can be realized for each of the laser beams having the different wavelengths.

The polarization BS 104 is adjusted and disposed such that the polarization plane thereof is aligned with each of the polarization planes of the laser beams emitted from the three-wavelength laser 101. Therefore, each of the laser beams having the different wavelengths which are converted into the parallel light beams by the collimator lens 103 substantially completely transmits through the polarization BS 104.

The mirror 105 changes each of the optical paths of the laser beams from the polarization BS 104 upward in the objective lens 109 direction.

The aperture limiting element 106 cuts off the circumference of the laser beam according to a substrate thickness of a disc. Therefore, the numerical aperture (NA) of each of the laser beams incident on the objective lens 109 is adjusted. That is, the numerical aperture of the objective lens 109 is determined in advance for each of the laser beams based on the substrate thickness of a disc. Thus, when the aperture limiting element 106 cuts off the circumferential portion of the laser beam such that the numerical aperture corresponding to the substrate thickness of the disc is obtained, each of the laser beams is allowed to enter the objective lens 109 at an appropriate, effective diameter.

For example, when the optical pickup device is a compatible device for CD/DVD/next-generation-DVD (0.6 mm in substrate thickness), only a substrate thickness of a CD (1.2 mm) is larger than those of the other discs. Therefore, only the NA of the laser beam for CD is set to a value smaller than that of each of the other laser beams based on the substrate thickness. The aperture limiting element 106 cuts off the circumferential portion of only the laser beam for CD to adjust the effective diameter of the laser beam for CD incident on the objective lens 109, thereby adjusting the numerical aperture of the laser beam for CD to a designed value.

For example, a diffraction grating can be used as the aperture limiting element 106. A wavelength selective diffraction pattern is formed in the diffraction grating at an incident position of the circumferential portion of the laser beam. The circumferential portion of the laser beam having the corresponding wavelength is diverged by the diffraction action of the pattern. For example, in the case of the compatible device for CD/DVD/next-generation-DVD (0.6 mm in substrate thickness), a diffraction pattern for diffracting only the laser beam for CD (780 nm in wavelength) is formed at the incident position of the circumferential portion. As a result, the circumferential portion of the laser beam for CD is diverged by the diffraction to guide only the central portion thereof in the objective lens 109 direction.

Alternatively, a polarization type filter can be used as the aperture limiting element 106. That is, the polarization type filter is disposed at the position of the circumferential portion of a laser beam which is to be subjected to aperture limitation, and the polarization plane of the laser beam is made orthogonal to the polarization plane of the polarization type filter. In this case, only the polarization plane of the laser beam which is to be subjected to aperture limitation is made orthogonal to the polarization plane of the polarization type filter. Thus, it is necessary to provide an additional member for rotating the polarization plane of the laser beam relative to the polarization planes of the other laser beams by 90°. For example, a wavelength selective λ/2 plate can be used as such member.

A phase type filter can be also used as the aperture limiting element 106. In this case, it is necessary to adjust a thickness of the phase type filter to filter only the laser beam which is to be subjected to aperture limitation.

The wavefront correcting element 107 corrects a wavefront state of a laser beam in accordance with a servo signal from the servo circuit 202. As described above, each of the laser beams having the different wavelengths which are emitted from the three-wavelength laser 101 is converted into the parallel laser beam by the collimator lens 103, so that the laser beam after passing through the aperture limiting element 106 becomes a parallel laser beam. In contrast to this, for example, when the objective lens 109 is designed so as to become a finite system for only a laser beam having a predetermined wavelength, it is necessary to correct a wavefront state of the laser beam having the predetermined wavelength based on the design. In this case, the wavefront correcting element 107 provides wavefront correcting action to the laser beam having the predetermined wavelength such that the wavefront state of the laser beam becomes an adequate state.

More specifically, assume that the objective lens 109 is designed so as to become an infinite system for the laser beam for DVD (655 nm in wavelength) and the laser beam for next-generation DVD (408 nm in wavelength) and to become a finite system for the laser beam for CD (780 nm in wavelength). Only when the laser beam for CD is used, the wavefront correcting element 107 is driven to correct the wavefront state of the laser beam for CD to a wavefront state that fits to the specification of the objective lens 109.

For example, a liquid crystal element as described in JP 2895150 B can be used as the wavefront correcting element 107. That is, a plurality of concentric ring transparent electrodes are disposed to sandwich the liquid crystal element in an optical axis direction. The liquid crystal element is disposed such that the optical axis of a laser beam passes through the center of each of the concentric ring transparent electrodes. Voltages are applied to the transparent electrodes to produce different refraction indexes of the liquid crystal element in a ring shape, thereby bending the wavefront state of the laser beam. Are fraction index at each position of the transparent electrode can be adjusted according to an amplitude of the applied voltage. Therefore, the wavefront state of the laser beam can be adjusted to an adequate state by adjusting the applied voltage.

Alternatively, a birefringence element according to JP 2003-149443 A can be used as the wavefront correcting element 107. A mechanical adjustment mechanism such as a beam expander or a lens inserting mechanism can be also used.

When the objective lens 109 is designed so as to become an infinite system for all the laser beams, the wavefront correcting element 107 is unnecessary. In this case, the wavefront correcting element 107 is omitted from the optical system shown in FIG. 1.

The λ/4 plate 108 converts each of the laser beams that have completely transmitted through the polarization BS 104 (linearly polarized light beam) into a circularly polarized light beam. In addition, the λ/4 plate 108 converts a laser beam reflected from the disc (circularly polarized light beam) into a linearly polarized light beam having a polarization direction orthogonal to that of a laser beam incident thereon from the side of the wavefront correcting element 107. Therefore, the laser beam reflected from the disc is substantially completely reflected by the polarization BS 104.

The objective lens 109 is designed so as to adequately converge each of the laser beams having the different wavelengths on a recording layer. As described above, the objective lens 109 is designed so as to become an infinite system or a finite system for each of the laser beams.

The objective lens actuator 300 drives the objective lens 109 in response to servo signals (tracking servo signal and focus servo signal) from the servo circuit 202. The description of the structure of the objective lens actuator 300 is omitted because it is known.

The condensing lens 110 condenses the laser beam reflected by the polarization BS 104 (light beam reflected from the disc) onto the photo detector 112.

The second diffraction grating 111 aligns the optical axis of the laser beam for DVD, among the laser beams emitted from the three-wavelength laser 101, with the optical axis of the laser beam for next-generation DVD by the diffracting action. That is, a pattern designed to be capable of correcting a deviation in optical axis of the laser beam for DVD is formed in the second diffraction grating 111. A structure of the diffraction grating and optical axis deviation correcting action thereof will be described later.

The photo detector 112 has sensor patterns for deriving a reproduction RF signal, a focus error signal, and a tracking error signal from an intensity distribution of received laser beams. A signal from each of the sensor patterns is outputted to the reproduction circuit 201 and the servo circuit 202, which are provided on the disc apparatus side.

The reproduction circuit 201 performs calculation processing on sensor signals received from the photo detector 112 to derive a reproduction RF signal and demodulates the derived reproduction RF signal to produce reproduction data.

The servo circuit 202 performs calculation processing on sensor signals received from the photo detector 112 to derive a tracking error signal and a focus error signal, produces a tracking servo signal and a focus servo signal based on the tracking error signal and the focus error signal, and outputs the tracking servo signal and the focus servo signal to the objective lens actuator 300. In addition, the servo circuit 202 outputs a drive signal to the wavefront correcting element 107 in response to an instruction from the controller 203.

The controller 203 controls the respective parts according to an instruction from a key input portion (not shown) or the like.

Figure 2A:
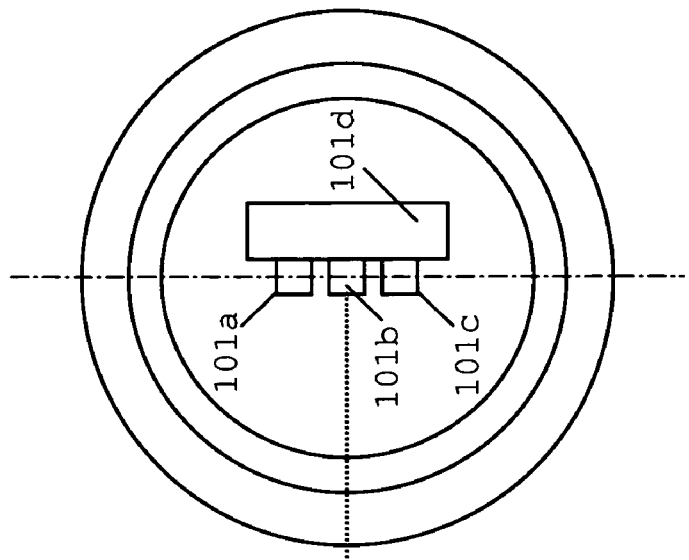
FIGS. 2A and 2B show a structure of a three-wavelength laser according to the embodiment.
Figure 2B:
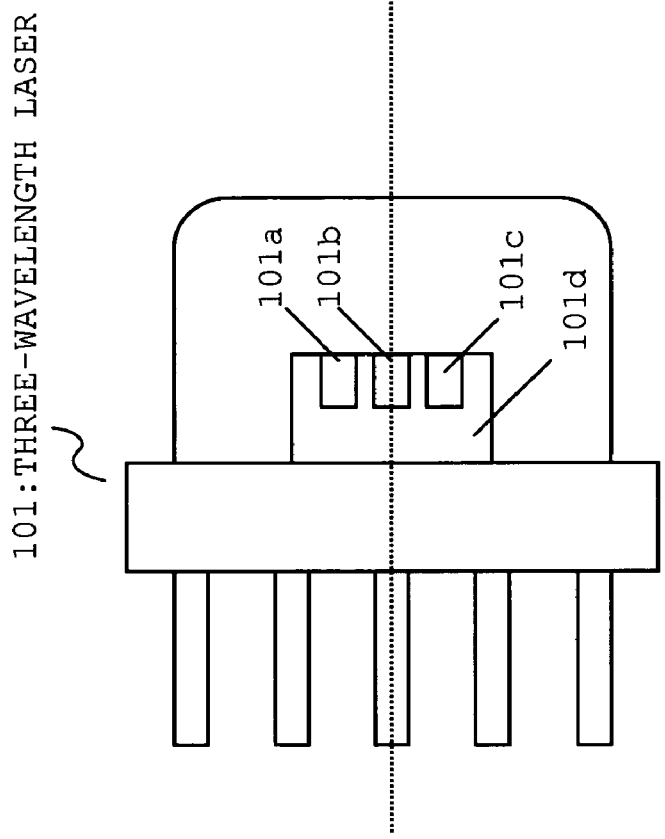

FIGS. 2A and 2B show a structure of the three-wavelength laser 101. FIG. 2B is a side view when FIG. 2A is viewed from the right side.

In FIGS. 2A and 2B, references 101a to 101c denote laser elements. As shown in FIGS. 2A and 2B, the laser elements 101a to 101c are mounted on a base 101d to be aligned on a straight line as viewed from the beam window side. A gap between the respective laser elements is such gap that the laser beams emitted from the laser elements 101a and 101c are diffracted by the first diffraction grating 102 and the second diffraction grating 111 such that the optical axes thereof are aligned with the optical axis of the laser beam emitted from the laser element 101b.

Optical axis deviation correcting action made by a diffraction grating will be described with reference to FIG. 3.

Figure 3:
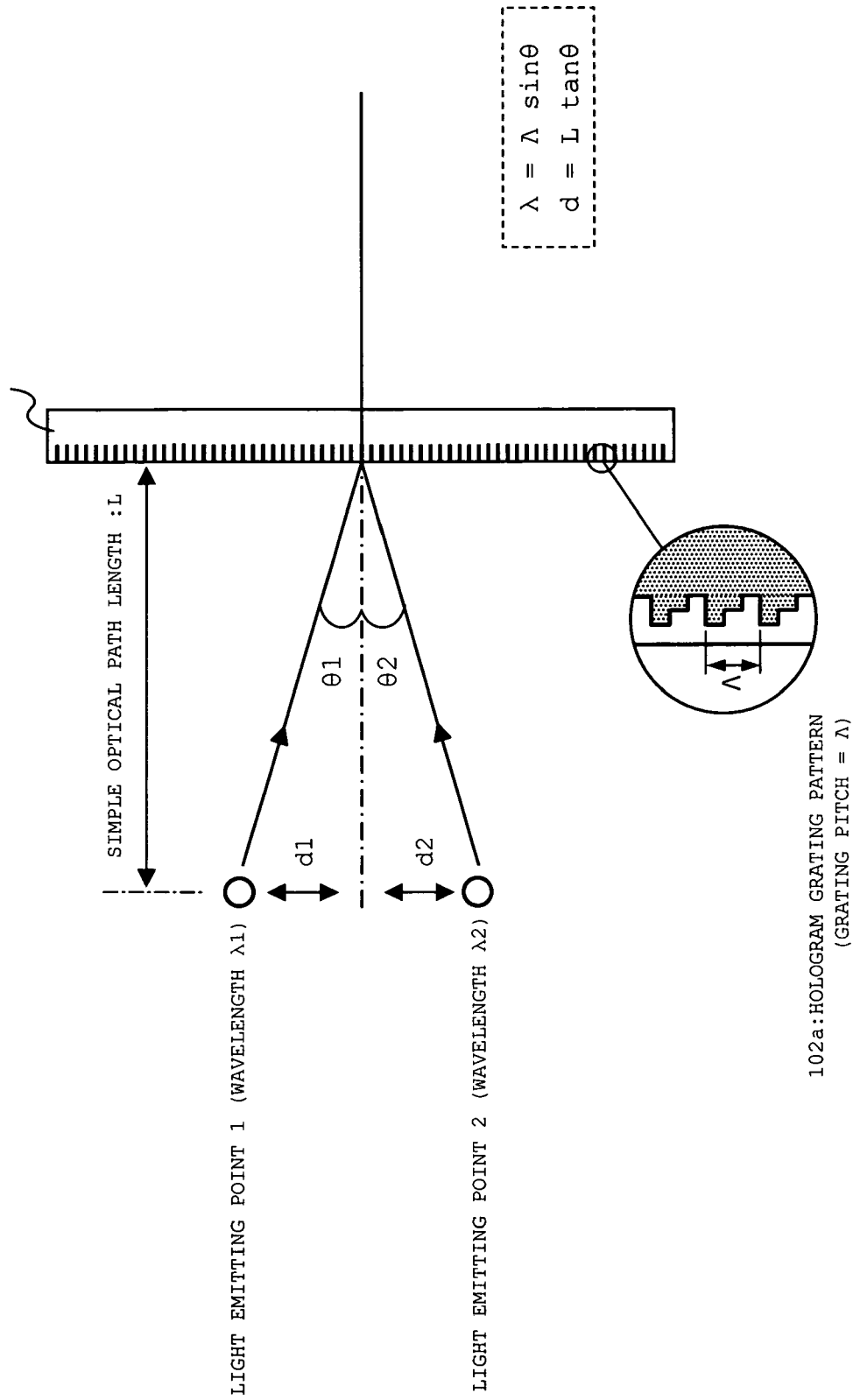
FIG. 3 is an explanatory view showing optical axis deviation correcting action made by a diffraction grating according to the embodiment.

When a hologram grating pattern as shown in FIG. 3 is formed on the surface on a laser beam incident side of the diffraction grating, laser beams emitted from light emitting points 1 and 2 are subjected to diffracting action by the grating pattern. FIG. 3 shows a grating pattern in which the number of steps is 3.

When a grating pitch is given by $\Lambda$, a relationship between a diffraction angle $\theta$ of first order diffraction light of a laser beam and a wavelength $\lambda$ thereof is expressed by the following expressions:

$$\lambda = \Lambda \sin \theta \qquad (1)$$

$$\theta = \sin^{-1} \lambda/\Lambda \qquad (2)$$

Therefore, when each of the optical axes of the laser beams from the light emitting points 1 and 2 are to be aligned with a reference optical axis by the diffracting action of the diffraction grating, light emitting point gaps d1 and d2 are expressed by the following expressions:

$$d1 = L \tan \theta 1 \qquad (3)$$

$$d2 = L \tan \theta 2 \qquad (4)$$

Thus, the light emitting point gaps d1 and d2 are set as follows based on wavelengths $\lambda 1$ and $\lambda 2$ of the laser beams from the light emitting points 1 and 2 and the grating pitch $\Lambda$ of the diffraction grating:

$$d1 = L \tan(\sin^{-1} \lambda 1/\Lambda) \qquad (5)$$

$$d2 = L \tan(\sin^{-1} \lambda 2/\Lambda) \qquad (6)$$

As is apparent from the above expressions (5) and (6), when a simple optical path length L is the same, the light emitting point gaps d1 and d2 are proportional to the wavelengths $\lambda 1$ and $\lambda 2$ of the emitted laser beams. Therefore, when the light emitting point gaps d1 and d2 are to be lengthened, the wavelengths of the laser beams from the light emitting points 1 and 2 may be increased.

In this embodiment, the laser beam for CD (780 nm in wavelength), the laser beam for DVD (655 nm in wavelength), and the laser beam for next-generation DVD (408 nm in wavelength) are emitted from the three-wavelength laser 101. Therefore, when the light emitting point gaps are to be lengthened, the laser beam for CD (780 nm in wavelength) and the laser beam for DVD (655 nm in wavelength), which have long wavelengths, may be diffracted to align the optical axes of those laser beams with the optical axis of the laser beam for next-generation DVD (408 nm in wavelength).

That is, a laser element for next-generation DVD (wavelength: 408 nm ), which has a shortest emitting laser wavelength, is located as the central laser element 101b of the laser elements 101a to 101c (see FIGS. 2A and 2B) housed in the three-wavelength laser 101. Laser elements for CD and DVD (wavelengths: 655 nm and 780 nm) are located to sandwich the laser element for next-generation DVD. Thus, the respective gaps d1 and d2 between the laser elements can be lengthened, with the result that the laser elements 101a to 101c can be easily arranged.

When the optical axis correction using the diffraction grating is performed, power of a laser beam to be subjected to optical axis alignment reduces in view of diffraction efficiency. Therefore, a laser beam which is to be maintained at high power may be excluded from laser beams subjected to optical axis alignment.

At present, emitting power of the laser element that emits the laser beam for next-generation DVD (wavelength: 408 nm) is weaker than laser power of the laser beam for CD (780 nm in wavelength) and laser power of the laser beam for DVD (655 nm in wavelength) As described above, when the laser element for next-generation DVD (wavelength: 408 nm) is located in the center to prevent optical axis correction using diffraction, the power of the laser beam for next-generation DVD which is originally weak can be maintained high.

Figure 4:
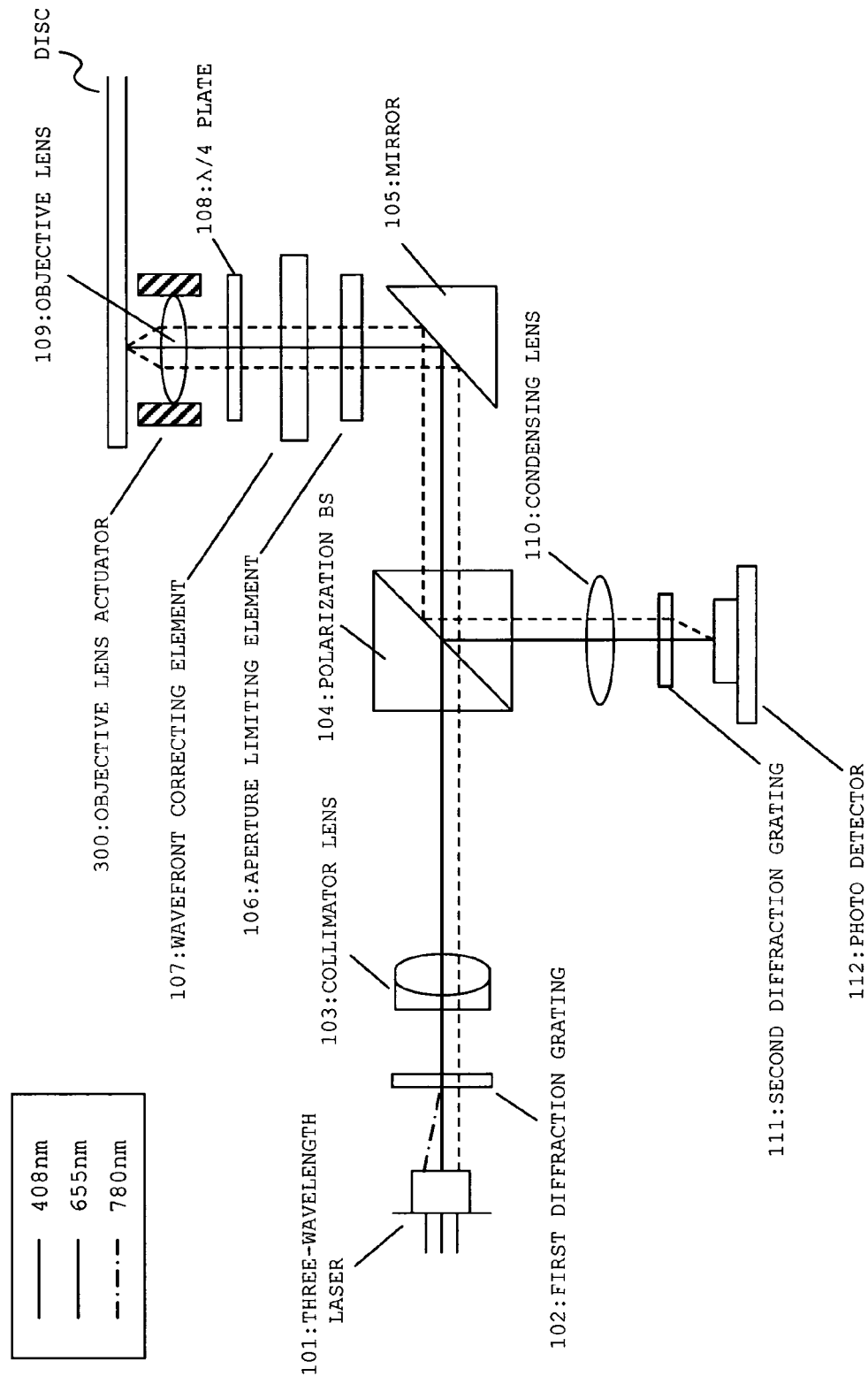
FIG. 4 is an explanatory diagram showing optical axis adjusting actions made by a first diffraction grating and a second diffraction grating.

FIG. 4 shows a relationship between the three laser beams emitted from the three-wavelength laser 101 and the optical axis adjusting actions made by the first diffraction grating 102 and the second diffraction grating 111.

As shown in FIG. 4, the optical axis of the laser beam for CD (wavelength: 780 nm), among the three laser beams emitted from the three-wavelength laser 101, is aligned with the optical axis of the laser beam for next-generation DVD (wavelength: 408 nm) by the first diffraction grating 102. The laser beam for DVD (wavelength: 655 nm) is not subjected to optical axis adjustment by the first diffraction grating 102 and thus is incident on the objective lens 109 with the optical axis deviation which occurs at the time of laser beam emission from three-wavelength laser 101.

The position of the objective lens 109 is adjusted with respect to the optical axis of the laser beam for next-generation DVD, serving as the reference optical axis. Therefore, the laser beam for CD and the laser beam for next-generation DVD are converged onto the disc without aberration by the objective lens 109. In contrast to this, the laser beam for DVD is incident on the objective lens 109 with a state where the optical axis thereof is deviated, so that aberration is produced in the converged light beam on the disc.

In general, because aberration is inversely proportional to a wavelength of a laser beam, aberration produced in the laser beam for DVD does not become larger to the extent that recording/reproduction characteristics are severely affected thereby. Instead, when the laser beam for DVD is used as a recording beam, it is preferable to put the maintenance of high laser power without the optical axis alignment using diffraction as in this embodiment before the optical axis alignment that causes reduction in laser power by diffraction. When laser power required for recording can be maintained even if the optical axis alignment is performed to the laser beam for DVD, an additional diffraction grating for adjusting the optical axis of the laser beam for DVD may be disposed in the front stage of the collimator lens 103.

Of the laser beams reflected from the disc, the laser beam for DVD is diffracted by the second diffraction grating 111 and the optical axis thereof is bent to guide the laser beam for DVD onto the photo detector 112. The laser beam for CD and the laser beam for next-generation DVD are converged onto the photo detector 112 without the optical axis adjustment by the second diffraction grating 111.

A grating pattern (grating pitch:Λ) for aligning the optical axes of the laser beams for CD and DVD with the optical axis of the laser beam for next-generation DVD is set in each of the first diffraction grating 102 and the second diffraction grating 111 based on the above expressions (5) and (6). Therefore, when the light emitting point gaps d1 and d2 between the laser element for next-generation DVD and the laser element for CD and between the laser element for next-generation DVD and the laser element for DVD are deviated from the light emitting point gaps at the time of setting the grating pattern, the optical axis adjustment for the laser beam for CD and the laser beam for DVD cannot be adequately performed without any processing. In this case, the first diffraction grating 102 and the second diffraction grating 111 are moved back and forth in the reference optical axis direction to adjust the simple optical path length L.

Figure 5A:
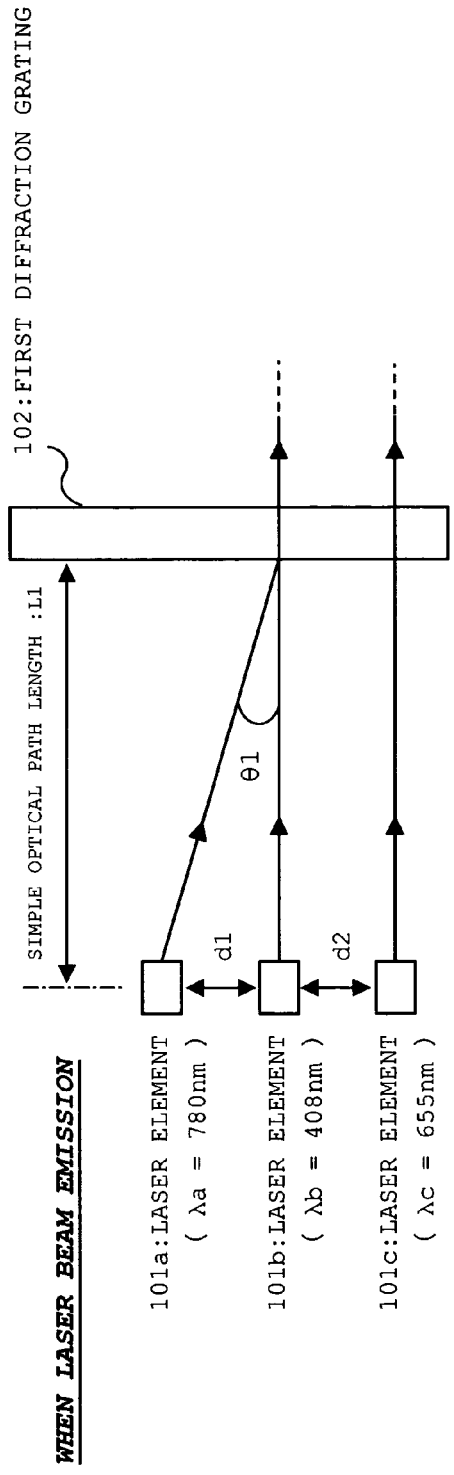
FIGS. 5A and 5B are explanatory diagrams showing the optical axis adjusting action made by the first diffraction grating and the second diffraction grating.
Figure 5B:
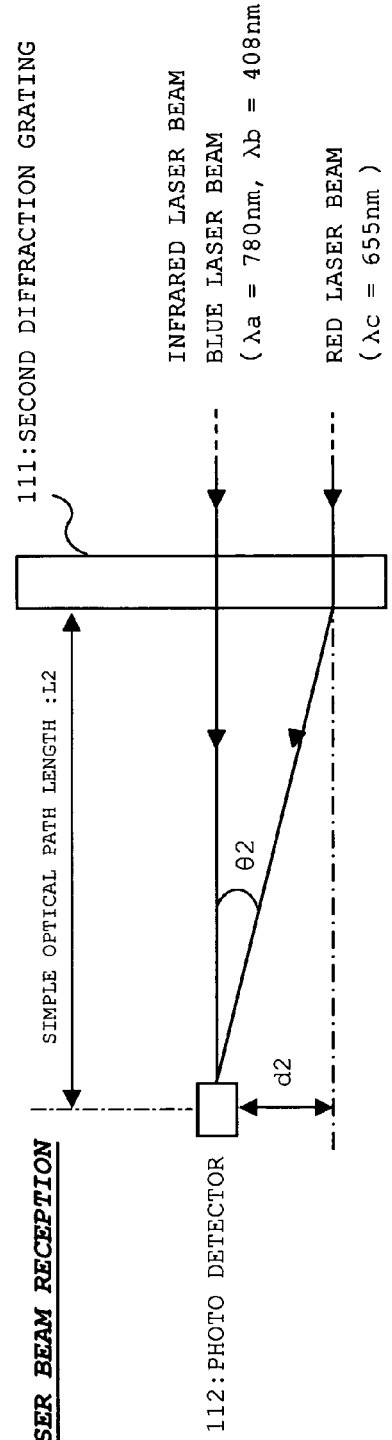

FIGS. 5A and 5B show the optical axis correcting actions made by the first diffraction grating 102 and the second diffraction grating 111.

With reference to FIG. 5A, when the light emitting point gap d1 related to the laser element 101a (for CD) becomes larger than a design gap value, the first diffraction grating 102 is moved to a position at which θ1 becomes a design angle value to keep it away from the three-wavelength laser 101. On the other hand, when the light emitting point gap d1 becomes smaller than the design gap value, the first diffraction grating 102 is moved to the position at which θ1 becomes the design angle value to bring it close to the three-wavelength laser 101.

Similarly, with reference to FIG. 5B, when the light emitting point gap d2 related to the laser element 101c (for DVD) becomes larger than a design gap value, the second diffraction grating 111 is moved to a position at which θ2 becomes a design angle value to keep it away from the three-wavelength laser 101. On the other hand, when the light emitting point gap d2 becomes smaller than the design gap value, the second diffraction grating 111 is moved to the position at which θ2 becomes the design angle value to bring it close to the three-wavelength laser 101.

When the positions of the diffraction gratings can be fine adjusted, the second diffraction grating 111 is being moved back and forth in the optical axis direction with a state where a disc (DVD) is irradiated with the laser beam emitted from the laser element for DVD, and an output from the photo detector 112 is monitored. Then, the second diffraction grating 111 is positioned at a position where the output from the photo detector 112 is optimized. After that, the first diffraction grating 102 is being moved back and forth in the optical axis direction with a state where a disc (CD) is irradiated with the laser beam emitted from the laser element for CD, and an output from the photo detector 112 is monitored. Then, the first diffraction grating 102 is positioned at a position where the output from the photo detector 112 is optimized.

Details of the method of arranging the diffraction grating will be described later with reference to FIGS. 8A and 8B and subsequent drawings.

FIG. 6 shows a relationship between the grating pattern of the first diffraction grating 102 and diffraction efficiency thereof.

FIG. 6 shows a result obtained by simulation when the number of steps of the grating pattern is set to 3. A simulation condition is described in a margin below a characteristic graph showing the result obtained by simulation. In the graph, "Blue 0th", "Red 0th", and IR-1st show a diffraction efficiency characteristic of zero-order diffraction light of the laser beam having the wavelength of 408 nm, a diffraction efficiency characteristic of zero-order diffraction light of the laser beam having the wavelength of 655 nm, and a diffraction efficiency characteristic of negative first-order diffraction light of the laser beam having the wavelength of 780 nm, respectively.

As is apparent from FIG. 6, when a step height H is set to about 4.35 μm when the grating pattern has three steps, the diffraction efficiency of the laser beam having the wavelength of 780 nm (for CD) can be improved to slightly over 40% while the diffraction efficiency of the blue-violet laser beam having the wavelength of 408 nm (for next-generation DVD) and the diffraction efficiency of the red laser beam having the wavelength of 655 nm (for DVD) is maintained at nearly 100%.

FIG. 7 shows a relationship between the grating pattern of the second diffraction grating 111 and diffraction efficiency thereof.

FIG. 7 shows a result obtained by simulation when the number of steps of the grating pattern is set to 4. A simulation condition is described in a margin below a characteristic graph showing the result obtained by simulation. In the graph, "Blue 0th", Red+1st, and "IR 0th" show a diffraction efficiency characteristic of zero-order diffraction light of the laser beam having the wavelength of 408 nm, a diffraction efficiency characteristic of positive first-order diffraction light of the laser beam having the wavelength of 655 nm, and a diffraction efficiency characteristic of zero-order diffraction light of the laser beam having the wavelength of 780 nm, respectively.

As is apparent from FIG. 7, when the step height H is set to about 1.75 μm when the grating pattern has four steps, the diffraction efficiency of the laser beam having the wavelength of 655 nm (for DVD) can be improved to about 80% while the diffraction efficiency of the blue-violet laser beam having the wavelength of 408 nm (for next-generation DVD) and the diffraction efficiency of the infrared laser beam having the wavelength of 780 nm (for CD) is maintained at nearly 100%.

When the diffraction gratings shown in FIGS. 6 and 7 are used as the first diffraction grating 102 and the second diffraction grating 111, the diffraction efficiencies of the blue-violet laser beam (for next-generation DVD), the red laser beam (for DVD), and the infrared laser beam (for CD) which have passed through the first diffraction grating 102 and the second diffraction grating 111 become 95.5%×96.1%=91.8%, 95.9%×78.2%=75.0%, and 42.3%×98.0%=41.5%, respectively. Therefore, even when the two diffraction gratings are used, the laser beam having sufficient power can be converged onto the photo detector 112. In particular, the power of the blue-violet laser beam (for next-generation DVD) is reduced by only less than 10%, with the result that high laser power can be maintained.

When a most preferable step height is set as the step height of the grating pattern, the simulations shown in FIGS. 6 and 7 are performed, diffraction efficiencies at the respective wavelengths are compared with one another based on results obtained by the simulations, and conditions that need to be satisfied by the laser beams having the different wavelengths are taken into account. For example, as described above, the emitting power of the blue-violet laser beam is weaker than that of each of the other laser beams at present. Therefore, first, the diffraction efficiency of the blue-violet laser beam is set to 90% or more. Next, optimum step heights for the remaining two laser beams are selected from a step height range satisfying the diffraction efficiency. At this time, when it is unnecessary to set the power of the laser beam for CD to very high power (for example, when an intended disc is a reproduction-only CD) as described above, it is desirable to select a step height whereby the diffraction efficiency of the laser beam for DVD becomes larger even if only slightly. When both powers for CD and DVD are to be increased, it is desirable to select a step height that both the powers become higher in a balanced manner.

Next, a method of arranging the diffraction grating will be described. Note that, in the above, the description is given assuming that the laser elements 101a to 101c are aligned on a straight line. Here, as shown in FIGS. 8A and 8B, a description is given assuming that the laser elements 101a to 101c are arranged at arbitrary positions.

Figure 8:
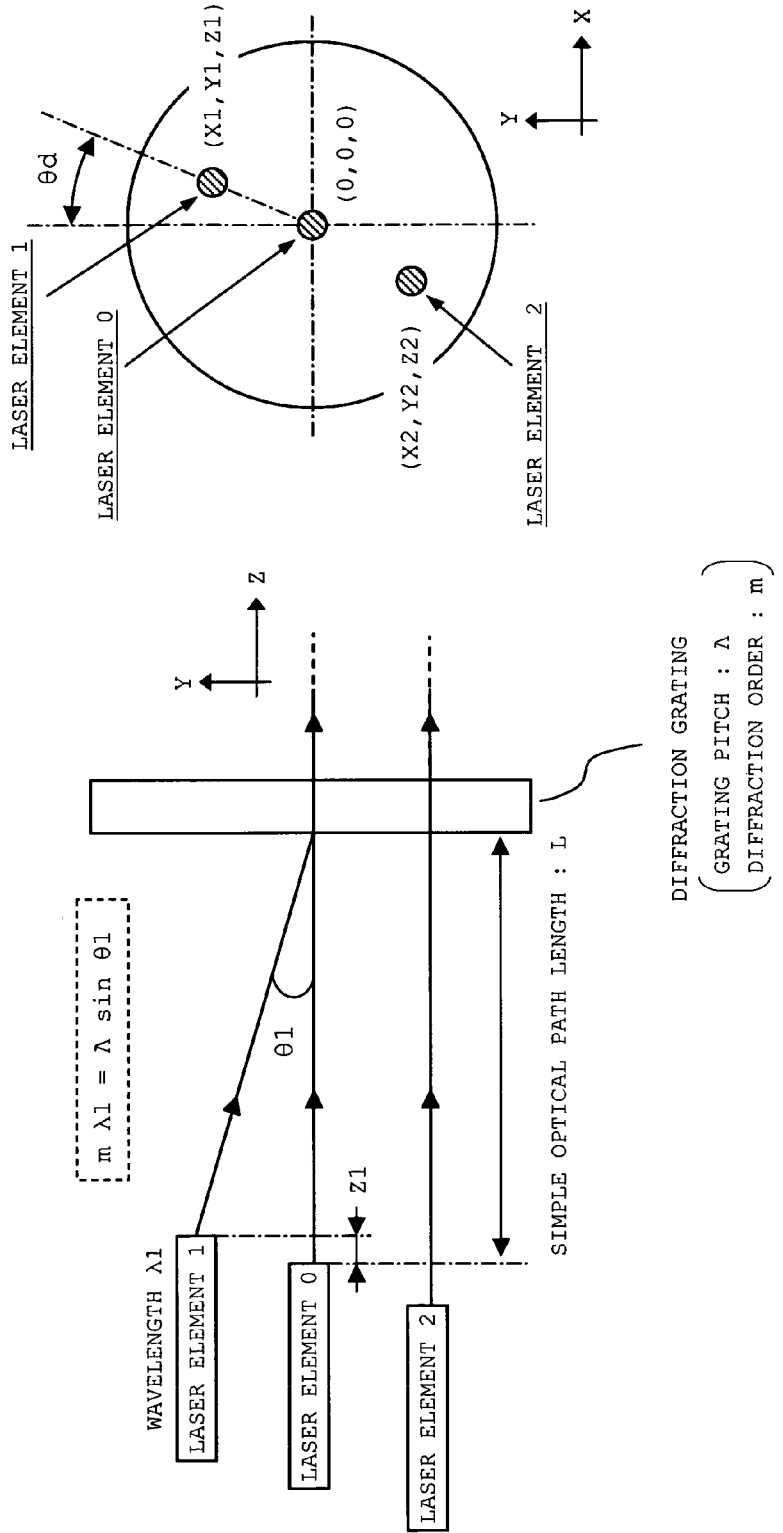
FIGS. 8A and 8B are explanatory diagrams showing a method of arranging the diffraction grating according to the embodiment.

As shown in FIGS. 8A and 8B, when three-dimensional orthogonal coordinates are set and a laser element 0 for emitting the reference laser beam is arranged at its origin, the simple optical path length L from the laser element 0 to diffraction grating is expressed by the following expression.

$$L = Z1 + \frac{\sqrt{X1^2 + Y1^2}}{\tan(\sin^{-1}(m\lambda/\Lambda))} \quad (7)$$

Here, when θ1 is sufficiently small, tan θ1=sin θ1=θ1 is obtained, and thus this expression is approximated by the following expression.

$$L = Z1 + \frac{\sqrt{X1^2 + Y1^2}}{m\lambda/\Lambda} \quad (8)$$

Therefore, when coordinate values (X1, Y1, Z1) of a laser element 1 and a wavelength λ1 are given as designed values of the semiconductor laser, arrangement position of the diffraction grating designed as described above can be accordingly obtained by assigning values to the corresponding parameters of expression (8).

Incidentally, the coordinate values (X1, Y1, Z1) and the wavelength λ1 of the laser element 1 usually have some variations from the given designed values due to manufacturing errors etc. With the variations, the simple optical path length L for arranging the diffraction grating varies. In this case, by assigning parameter values adjusted in consideration of variation values to the expression (8), an appropriate simple optical path length can be obtained.

For example, when a variation ΔX1 occurs in a coordinate value X1, X1+ΔX1 is assigned to X1 of the expression (8). Note that, a variation value ΔL of the simple optical path length L can be obtained by the following expression based on the expression (8).

$$\Delta L = (L - Z1)\left(\sqrt{1 + \frac{2X1 \cdot \Delta X1}{X1^2 + Y1^2} + \frac{\Delta X1^2}{X1^2 + Y1^2}} - 1\right) \quad (9)$$

Similarly, when a variation ΔY1 occurs in a coordinate value Y1, the variation value ΔL of the simple optical path length L can be obtained by the following expression based on the expression (8).

$$\Delta L = (L - Z1)\left(\sqrt{1 + \frac{2Y1 \cdot \Delta Y1}{X1^2 + Y1^2} + \frac{\Delta Y1^2}{X1^2 + Y1^2}} - 1\right) \quad (10)$$

Note that when a variation ΔZ1 occurs in a coordinate value Z1, the variation value ΔL of the simple optical path length L is as follows.

$$\Delta L = \Delta Z1 \quad (11)$$

Further, when a variation Δλ1 occurs in the wavelength λ1, the variation value ΔL of the simple optical path length L can be obtained by the following expression based on the expression (7).

$$\Delta L = \sqrt{X1^2 + Y1^2} \quad (12)$$

$$\left(\frac{1}{\tan\left(\sin^{-1}\frac{m(\lambda 1 + \Delta\lambda 1)}{\Lambda}\right)} \cdot \frac{1}{\tan\left(\sin^{-1}\frac{m\lambda}{\Lambda}\right)}\right)$$

Here, when θ1 is sufficiently small, tan θ1=sin θ1=θ1 is obtained, and thus this expression is approximated by the following expression.

$$\Delta L = \frac{\sqrt{X1^2 + Y1^2}}{m} \cdot \Lambda\left(\frac{\Delta\lambda 1}{\lambda 1 (\lambda 1 + \Delta\lambda 1)}\right) \quad (13)$$

By assigning the expression (8) to this expression, ΔL is transformed into the following expression.

$$\Delta L = -(L - Z1)\left(\frac{\Delta\lambda 1}{\lambda 1 + \Delta\lambda 1}\right) \quad (14)$$

By combining the variation values AL obtained in the expressions (9), (10), (11), and (14) with the simple optical path length L obtained in the expression (8), a simple optical path length L' upon variation of the coordinate values (X1, Y1, Z1) and the wavelength λ1 of the laser element 1 can be obtained. The simple optical path length L' thus combined can be represented by the following expression.

$$L' = (L - Z1)$$

$$\left( \sqrt{1 + \frac{(2X1 \cdot \Delta X1 + 2Y1 \cdot \Delta Y1 + \Delta X1^2 + \Delta Y1^2)}{(X1^2 + Y1^2)}} - \frac{\Delta \lambda 1}{(\lambda 1 + \Delta \lambda 1)} \right) +$$

$$Z1 + \Delta Z1 \quad (15)$$

The optical correction diffraction grating may be arranged at a position obtained by the simple optical path length L' based on the expression (15) from the designed values of the coordinate values (X1, Y1, Z1) and the wavelength λ1 of the laser element 1 and expected variation values ΔX1, ΔY1, ΔZ1, and Δλ1. At this time, since the expected variation values ΔX1, ΔY1, ΔZ1, and Δλ1 have predetermined widths (usually, limit of the variation values are determined by the specification: specification values), the simple optical path length L' also has a predetermined width. Therefore, the optical correction diffraction grating is preferably fixed in a range of the width, or set in a range of the width and then displaced in the optical axis direction for fine adjustment to such position that the output from the photo detector 112 is optimized.

Note that when the optical correction diffraction grating is fixed without fine adjustment at a predetermined position in the variation width of the simple optical path length L', an optical axis shift occurs sometimes. However, in this case too, the variation width of the simple optical path length L' is obtained in consideration of the expected variation values ΔX1, ΔY1, ΔZ1, and Δλ1, and therefore the optical axis shift will not be so large. That is, when the optical correction diffraction grating arrangement position is determined based on the expression (15), even without the fine adjustment to such position that the output from the photo detector 112 is optimized, a relatively satisfactory optical correction effect can be expressed.

Further, while assuming that the range of the variation width of the simple optical path length L' falls in the arrangement area or arrangement stroke for the diffraction grating, the optical system is preferably designed such that other optical elements are not arranged in this range. That is, the expression (15) is useful for setting the arrangement position for the diffraction grating and also for designing arrangement positions of other optical elements and the shape of the optical pickup device.

Note that in the semiconductor laser shown in FIG. 2, the laser elements 101a to 101c are aligned on a straight line. Thus, the coordinate values X1 and Z1 are both 0 in the expression (15). Therefore, in this case, by setting X1=0 and Z1=0, the simple optical path length L' may be obtained from the expression (15).

Incidentally, while showing as an example, in FIGS. 8A and 8B, the case where the optical correction diffraction grating is arranged in the latter stage of the laser element, the above description is given based on the expression (15) for the diffraction grating position setting of this case. When the optical correction diffraction grating is arranged in the former stage of the photo detector 112 as shown in FIG. 5B, the arrangement position for the diffraction grating is obtained based on the simple optical path length L' obtained from the expression (15) in the following manner.

Figure 9:
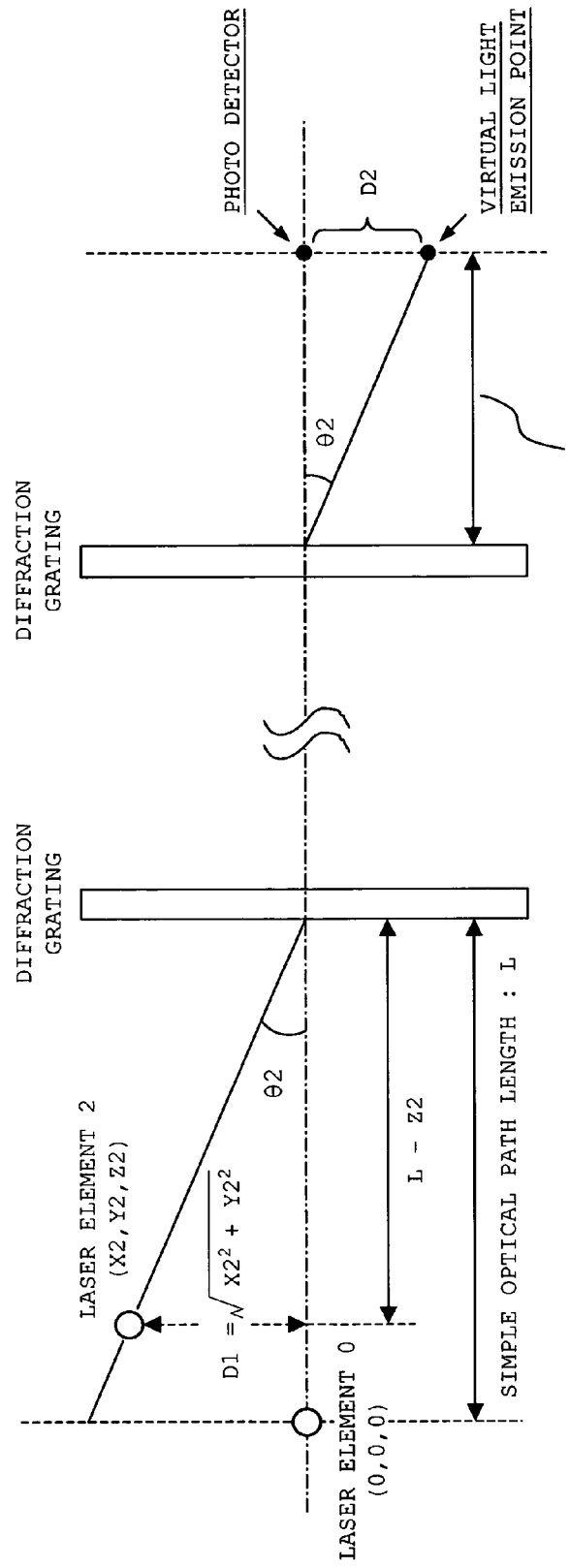
FIG. 9 is an explanatory diagram showing the method of arranging the diffraction grating according to the embodiment.

That is, with reference to FIG. 9, when the light emitting point of the laser element 2 shifts from the optical axis of the laser element 0 (reference optical axis) by a distance D1, if optical correction is not performed, a distance D2 to the reference optical axis of the convergence point on the photo detector 112 can be expressed by the following expression.

$$D2=(f2/f1) \cdot D1 \quad (16)$$

Note that f1 and f2 respectively denote focal distances from the collimator lens 103 and the condensing lens 110.

When the optical correction diffraction grating is arranged in the former stage of the photo detector 112, it is assumed that the light emitting point exists at a position by the distance D2, and a method of arranging the diffraction grating based on the expression (15) is adapted. That is, with reference to FIG. 9, it is assumed that the laser element is arranged at a virtual light emitting point, and a simple optical path length Lpd from the photo detector is obtained.

Here, based on FIG. 9, the following relation is established between Lpd and L.

$$Lpd/(L-Z2)=D2/D1 \quad (17)$$

Therefore, by assigning the expression (16) to the expression (17), the following relational expression is obtained.

$$i \; Lpd=(f2/f1)(L-Z2) \quad (18)$$

When designed values of coordinate values (X2, Y2, Z2) and a wavelength λ2 of a laser element 2 are given, a simple optical path length L is obtained from the expression (8). Further, the simple optical path length L thus obtained is assigned to the expression (18), whereby the arrangement position for the diffraction grating in the former stage of the photo detector 112 (corresponding to the designed values) is obtained.

Then, from the designed values of coordinate values (X2, Y2, Z2) and the wavelength λ2 of the laser element 2 and expected variation values ΔX2, ΔY2, ΔZ2, and Δλ2, a simple optical path length L' is obtained based on the expression (15). The simple optical path length L' thus obtained is assigned to L of the expression (18), whereby the diffraction grating arrangement position in consideration of the variation values can be obtained.

Figure 10:
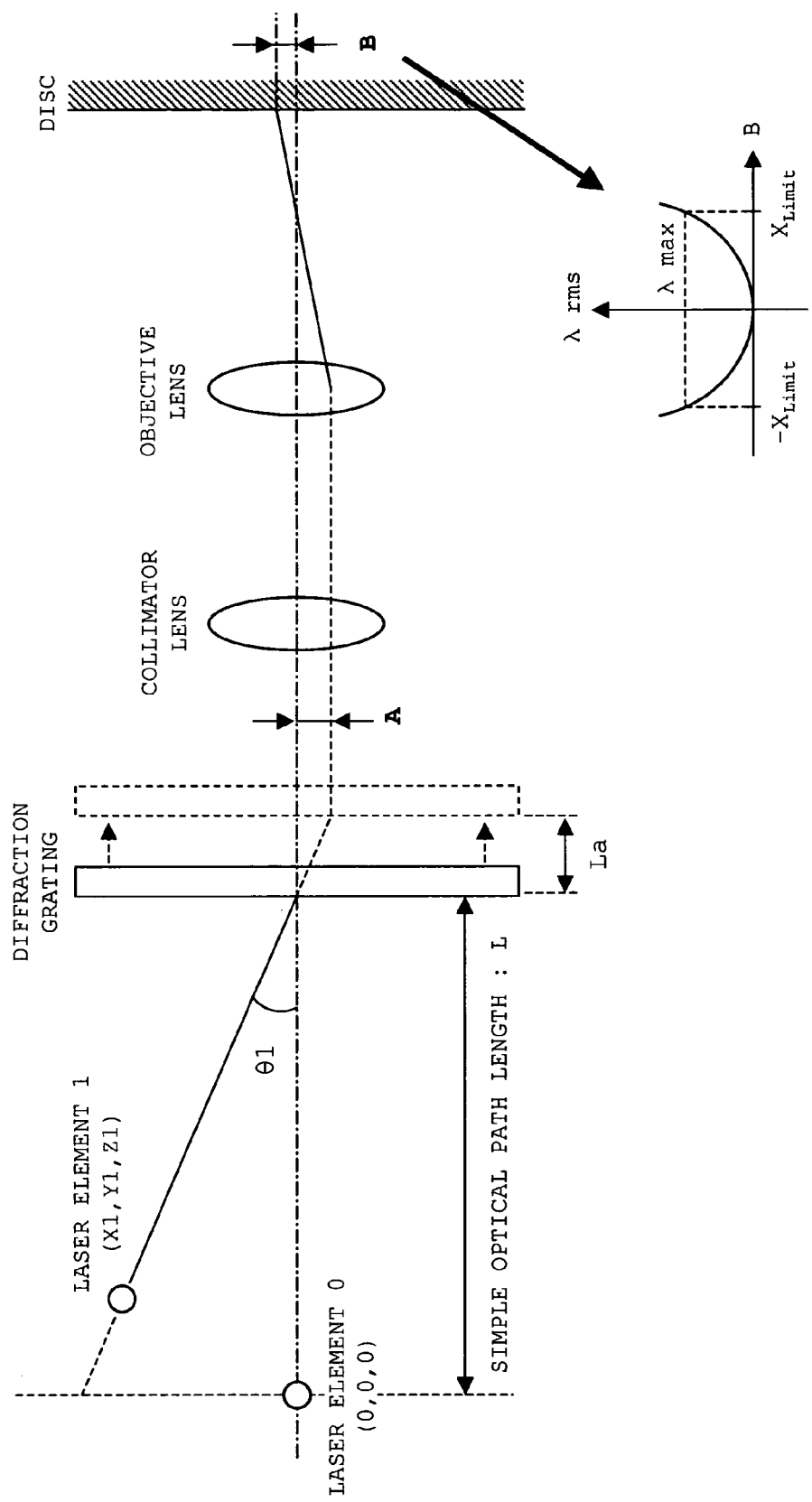
FIG. 10 is an explanatory diagram showing the method of arranging the diffraction grating according to the embodiment.

Incidentally, when the diffraction grating arrangement position shifts from the appropriate position in FIG. 8A, the optical axis of the laser beam from the laser element 1 shifts from the optical axis of the optical system. Therefore, wave aberration occurs on the disc surface. That is, as shown in FIG. 10, when the diffraction grating position shifts from the appropriate position by La, an image height on the disc becomes B. Accordingly, wave aberration occurs in the laser beam from the laser element 1. Here, the image height B and wave aberration Arms have a relation shown in the graph of FIG. 10. From optical characteristics of the objective lens, disc types, etc, a limit value λmax is set for the size of permissive wave aberration. Therefore, the arrangement shift La of the diffraction grating needs to be suppressed in such range that the wave aberration is not larger than the limit value λmax.

Here, the image height B and the optical axis shift A have the following relation.

$$i \; A=(fa/fb) \cdot B \quad (19)$$

Note that fa and fb respectively denote focal distances from the collimator lens and the objective lens. Also, from FIG. 10, the arrangement shift La of the diffraction grating and the optical axis shift A have the following relation.

$$A = La \cdot \tan\theta 1 \quad (20)$$

Therefore, from the expressions (19) and (20), the following expression is derived.

$$La = (1/\tan\theta 1)(fa/fb) \cdot B \quad (21)$$

An image height value Xlimit for setting the wave aberration to the limit value λmax is assigned to B of the expression (21), whereby a permissive value Lamax of the arrangement shift La is obtained. In FIG. 10, the diffraction grating may be arranged in a range of the simple optical path length L' obtained based on the expression (15) with a margin of the permissive value Lamax obtained based on the expression (21) one way or the other in the laser beam travelling direction.

Note that when a substrate element made of glass or the like having a predetermined thickness, such as another diffraction grating, is arranged between the diffraction grating for the optical axis correction and the laser element or between the diffraction grating for the optical axis correction and the photo detector, it is preferred to perform optical path correction for an amount corresponding to the substrate element on the simple optical path length obtained from the expression (8) or (15). That is, when its correction amount is ΔLm and a simple optical path length after the correction is Lm, the simple optical path length obtained from the expression (8) or (15) is corrected as in the following expression.

$$Lm = L(orL') + \Delta Lm \quad (22)$$
$$= L(orL') + \sum_{i=1}^{n} ti\left(1 - \frac{1}{ni}\right)$$

Wherein ti and ni denote a thickness in the optical axis and a refractive index of the substrate element, respectively.

Next, referring to FIG. 8B, an incline angle θd of the arrangement position of the laser element 1 with respect to the Y axis. As is obvious from FIG. 8B, the incline angle θd can be obtained from the following expression.

$$\theta d = \tan^{-1}(X1/Y1) \quad (23)$$

Here, when θ is sufficiently small, this can be approximated as tan θ=θ, so the incline angle θd can be obtained from the following expression.

$$\theta d = X1/Y1 \quad (24)$$

Since the incline angle θd is regulated by the coordinate values X1 and Y1, when the X or Y coordinate value varies among the designed values of the laser element 1, the value of the incline angle varies. While its variation value is Δθd, when the X coordinate value shifts by variation value ΔX1 from the designed value, Δθd can be obtained from the following expression based on the expression (23).

$$\Delta\theta d = \tan^{-1}((X1+\Delta X1)/Y1)) - \tan^{-1}(X1/Y1) \quad (25)$$

When the Y coordinate value shifts by variation value ΔY1 from the designed value, Δθd can be obtained from the following expression.

$$\Delta\theta d = \tan^{-1}(X1/(\Delta Y1+Y1)) - \tan^{-1}(iX1/Y1) \quad (26)$$

By combining the respective variation values Δθd derived in the expressions (25) and (26) with the incline angle θd derived in the expression (23), an incline angle θd' upon variation of the coordinate values (X1, Y1) of the laser element 1 can be obtained. Note that in the combination, if the term of $\tan^{-1}$ is approximated as Y1>>X1, the incline angle θd' can be derived in the following expression.

$$\theta d' = (Y1 \cdot \Delta Y1 - X1 \cdot \Delta X1)/(Y1 \cdot (Y1+\Delta Y1)) \quad (27)$$

The incline angle θd' is obtained based on the expression (27) from the designed values of the coordinate values X1 and Y1 of the laser element 1 and the expected variation values ΔX1 and ΔY1. The arrangement position of the diffraction grating for the optical axis correction is preferably set to such a position in an in-plane direction that the pitch direction of the optical correction diffraction grating conforms to the direction of the incline angle θd' obtained. At this time, since the expected variation values ΔX1 and ΔY1 have predetermined widths (usually, limit of the variation values are determined by the specification: specification values), the inclined angle θd' also has a predetermined width. Therefore, the optical correction diffraction grating is preferably set to a position in the in-plane direction within a range of the width, or set to this position before being rotated in the in-plane direction for fine adjustment to such a position that the output from the photo detector 112 is optimized.

Note that since the laser elements 101a to 101c are aligned in a straight line in the semiconductor laser of a type shown in FIG. 2, the coordinate value X1 in the expression (27) becomes 0. Therefore, in this case, X1=0 is set, so that the incline angle θd' can be obtained from the expression (27).

Further, when the diffraction grating is arranged in the former stage of the photo detector 112, a virtual light emitting point shown in FIG. 9 is obtained. While assuming that the laser element is arranged at the virtual point, the incline angle θd' is obtained based on the expression (27). Then, the position in the in-plane direction is preferably set so that the grading pattern of the optical correction diffraction grating conforms to the direction of the incline angle θd'.

As described above, according to the embodiment, since an inexpensive diffraction grating is used as the optical element for optical axis adjustment, the increase in cost for the optical pickup device can be suppressed. Further, the first diffraction grating 102 and the second diffraction grating 111 are individually arranged corresponding to the laser beam subject to the optical axis adjustment. Thus, even when a variation occurs in the arrangement gap between the laser elements, by performing positional adjustment on the corresponding diffraction grating in the reference optical axis, the optical axis of the laser beam can smoothly conform to the reference optical axis. At this time, preferably, the diffraction grating is arranged based on the above expressions and its positional adjustment is performed appropriately. Therefore, the diffraction grating arrangement or positional adjustment can be easily and smoothly performed.

Thus, according to the embodiment, the laser beam optical axis adjustment can be easily and smoothly performed while the increase in cost for the optical pickup device is suppressed.

Note that the present invention is not limited to the above embodiment, and it is needless to mention that other various modifications are possible.

For example, according to the embodiment, the blue-violet light laser element is arranged in the center, but other laser elements may be arranged in the center. However, in this case, from the expressions (5) and (6), as compared with the embodiment, the light emitting point gap becomes small.

Accordingly, the arrangement margin of the laser element becomes severe. And the refraction efficiency (power) of the blue-violet light sensor decreases.

Further, according to the embodiment, the number of steps of the first and second diffraction grating are set to 3 and 4, respectively, but the first and second diffraction gratings may be designed with other number of steps.

Moreover, according to the embodiment, the first diffraction grating 102 is arranged immediately after the three-wavelength laser 101 and the second diffraction grating 111 is arranged immediately before the photo detector 112. However, as shown in FIG. 11, the second diffraction grating 111 may also be arranged immediately after the three-wavelength laser 101. In this case, the DVD laser beam enters the objective lens 109 after its optical axis has been adjusted, so no aberration occurs in the DVD laser beam light on the disc. Therefore, as compared to the above case, the optical characteristics of the DVD laser beam light on the disc are improved.

Further, the first diffraction grating 102 and the second diffraction grating 111 may be both arranged immediately before the photo detector 112.

In addition, various modifications can be made from the embodiment of the present invention with the technical idea described in the scope of claims.

What is claimed is:

1. An optical pickup device for irradiating a recording medium with laser beams having different wavelengths, comprising:
    a semiconductor laser that houses plural laser elements having different emission wavelengths in a single package; and
    a diffraction grating for substantially matching by an diffraction effect, optical axes of laser beams among laser beams emitted from the laser elements except a reference laser beam whose optical axis conforms to an optical axis of an optical system with the optical axis of the reference laser beam,
    wherein the diffraction grating is individually prepared corresponding to laser beams subjected to optical axis correction and is arranged at a position on the optical axis of the optical system at an optical path length L' expressed by the following expression from a laser element for emitting the reference laser beam:

$$L' = (L-Z)(\sqrt{1+(2X \cdot \Delta X + 2Y \cdot \Delta Y + \Delta X^2 + \Delta Y^2)/(X^2+Y^2)} - \Delta\lambda/(\lambda+\Delta\lambda)) + Z + \Delta Z \quad (A)$$

where:
    when a travelling direction of the reference laser beam is set as Z axis of a three-dimensional orthogonal coordinate and the laser element for emitting the reference laser beam is arranged at its origin, X, Y, and Z denote coordinate positions on a coordinate axis of the laser element for emitting an optical axis adjustment target laser beam as designed values for the semiconductor laser;
    $\Delta X$, $\Delta Y$, and $\Delta Z$ denote variations between the designed values and the coordinate positions on the coordinate axis of the laser element for emitting the optical axis adjustment target laser beam as values of the X, Y, and Z axes of the coordinate axis;
    $\lambda$ denotes a wavelength of the optical axis adjustment target laser beam as designed values for the semiconductor laser;
    $\Delta\lambda$ denotes a wavelength variation between the wavelength of the optical axis adjustment target laser beam and the designed values of the semiconductor laser; and $$L=\Lambda \cdot ROOT(X^2+Y^2)/(m \cdot \lambda) + Z$$

($\Lambda$ denotes a grating pitch, and m denotes a diffraction order).

2. An optical pickup device according to claim 1, wherein the diffraction grating is arranged in a range between an upper limit value and a lower limit value of the optical path length L calculated by assigning specification values of $\Delta X$, $\Delta Y$, $\Delta Z$, and $\Delta\lambda$ to the expression (A).

3. An optical pickup device according to claim 1, wherein the diffraction grating is arranged in a range of an optical path length L' with a margin of addition or subtraction of an optical path length La expressed by the following expression:

$$La=(1/\tan\theta 1)(fa/fb) \quad (B)$$

where:
    $\theta$ denotes an incident angle of the optical axis adjustment target laser beam, at a position where the reference laser beam enters the diffraction grating, with respect to the optical axis of the reference laser beam, when the diffraction grating is arranged at the optical path length L' from the laser element for emitting the reference laser beam;
    fa denotes a focal distance of a collimator lens for converting the laser beam emitted of the semiconductor laser into a parallel beam; and
    fb denotes a focal distance from an objective lens for converging the laser beam onto the recording medium.

4. An optical pickup device according to claim 1, wherein when an optical axis of a laser beam entering a photo detector is matched with the optical axis of the reference laser beam, the diffraction grating is arranged at a position on the optical axis of the optical system at an optical path length Lpd expressed by the following expression from the photo detector:

$$Lpd=(f2/f1)(L-Z) \quad (C)$$

where:
    f1 denotes a focal distance of the collimator lens for converting the laser beam emitted of the semiconductor laser into the parallel beam; and
    f2 denotes a focal distance from the condensing lens for converging the laser beam from the recording medium onto the photo detector.

5. An optical pickup device according to claim 1 or 4, wherein when a substrate element is arranged between the diffraction grating and the laser element or between the diffraction grating and the photo detector, the diffraction grating is arranged at an optical path length obtained by adding an optical path length $\Delta Lm$ expressed in the following expression to the optical path length calculated in the expressions:

$$\Delta Lm = \sum_{i=1}^{n} ti\left(1 - \frac{1}{ni}\right) \quad (D)$$

where ti and ni denote a thickness in an optical axis direction and a refractive index of the substrate element, respectively.

6. An optical pickup device according to claim 1 or 4, wherein the position of the diffraction grating in an in-plane direction is set such that a pitch direction of the diffraction grating matches a direction of an incline angle $\theta d'$ expressed in the following expression:

$$\theta d' = (Y \cdot \Delta Y - X \cdot \Delta X)/(Y \cdot (Y + \Delta Y)) \qquad (E)$$

where θd' denotes an incline angle at an X-Y plane with respect to the Y axis provided that Y>>X.

7. An optical pickup device according to claim 6, wherein the position of the diffraction grating in the in-plane direction is set such that the pitch direction of the diffraction grating falls in a range of the upper limit value and the lower limit value of θd' calculated by assigning the specification values of ΔX and ΔY to the expression (E).

* * * * *